United States Patent [19]
Klink

[11] Patent Number: 5,735,580
[45] Date of Patent: *Apr. 7, 1998

[54] RAIL CAR LOAD SENSOR

[75] Inventor: Douglas D. Klink, Weatherby Lake, Mo.

[73] Assignee: Technical Services and Marketing Inc., Kansas City, Mo.

[*] Notice: The term of this patent shall not extend beyond the expiration date of Pat. No. 5,603,556.

[21] Appl. No.: 791,602

[22] Filed: Jan. 31, 1997

Related U.S. Application Data

[63] Continuation-in-part of Ser. No. 559,630, Nov. 20, 1995, Pat. No. 5,603,556.

[51] Int. Cl.$^6$ ............................................. D60T 13/24
[52] U.S. Cl. ........................ 303/22.6; 363/22.7; 363/198
[58] Field of Search .................... 300/22.1–22.8, 300/3.15, 20, 198

[56] References Cited

U.S. PATENT DOCUMENTS

| | | | |
|---|---|---|---|
| 3,490,814 | 1/1970 | Smith et al. | 303/22.6 |
| 3,597,613 | 8/1971 | Shah | 303/22.6 |
| 3,685,868 | 8/1972 | Nagsi et al. | 303/22.6 |
| 4,239,292 | 12/1980 | Nagase | 303/22.6 |
| 4,989,922 | 2/1991 | Pickerhahn et al. | 303/22.6 |
| 5,052,761 | 10/1991 | Thony | 303/22.6 |
| 5,100,207 | 3/1992 | McKay | 303/22.6 |
| 5,237,604 | 8/1993 | Ryan | 303/22.6 |
| 5,335,974 | 8/1994 | Klink | 303/22.6 |
| 5,393,129 | 2/1995 | Troiani et al. | 303/22.6 |
| 5,603,556 | 2/1997 | Klink | 303/22.6 |

*Primary Examiner*—Matthew C. Graham
*Attorney, Agent, or Firm*—Hovey, Williams, Timmons & Collins

[57] ABSTRACT

A rail car load sensor 10 configured for use with a rail car brake controller 12. The rail car load sensor (10) detects and measures the distance between the underside of the rail car 14 and a component of the rail car that remains stationery whenever the weight or load in the rail car changes. This distance is then transmitted to rail car brake controller 12 for adjusting the braking action of the rail car brake system in accordance with the amount of load or weight in rail car 14.

18 Claims, 1 Drawing Sheet

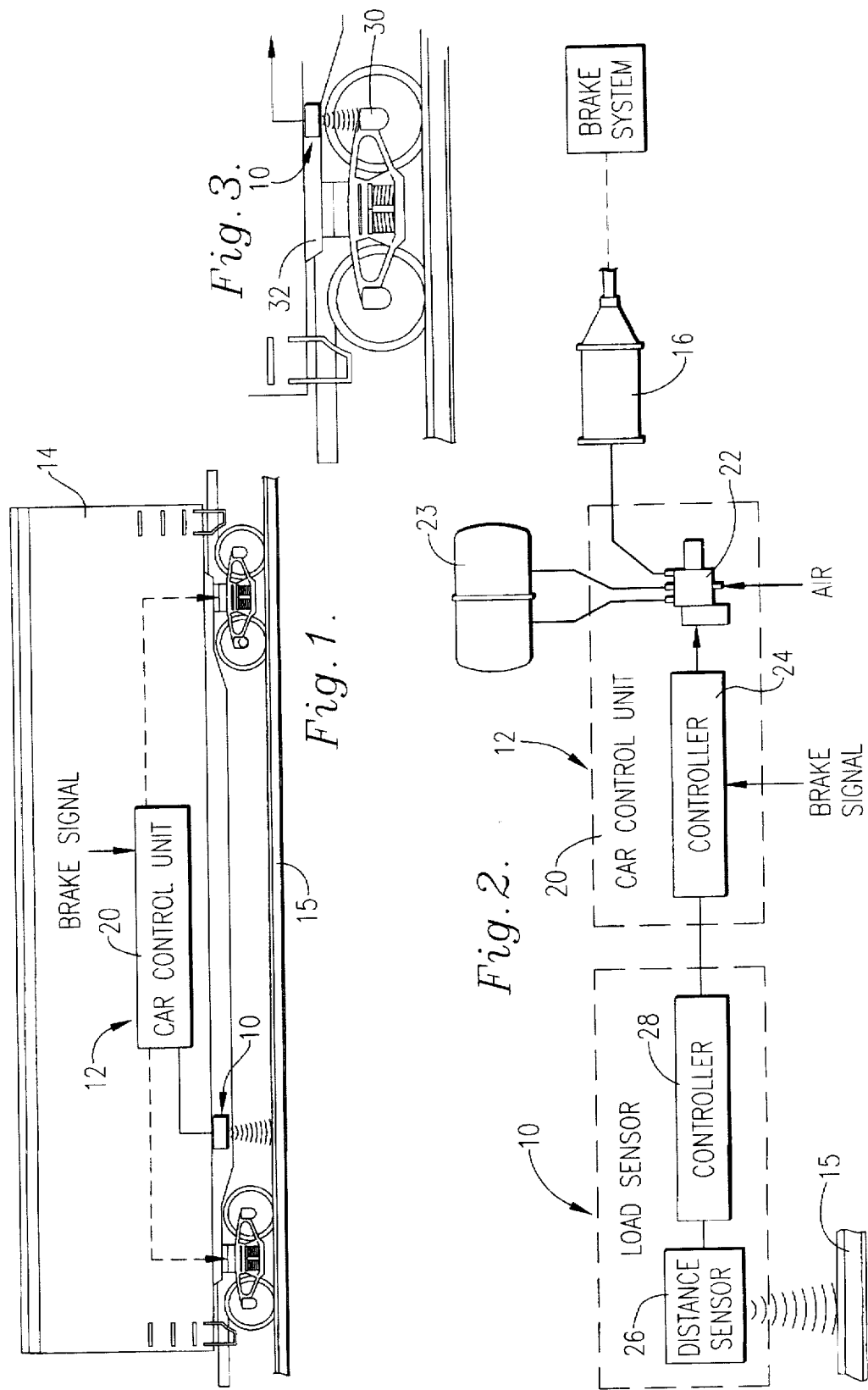

RAIL CAR LOAD SENSOR

RELATED APPLICATIONS

This application is a continuation-in-part of U.S. patent application Ser. No. 08/559,630, filed Nov. 20, 1995, entitled RAIL CAR LOAD SENSOR, now issued as U.S. Pat. No. 5,603,556.

BACKGROUND OF THE INVENTION

1. Field of the Invention

The present invention relates to rail car braking systems. More particularly, the invention relates to a rail car load sensor for adjusting the operation of a rail car braking system in accordance with the amount of load or weight in the rail car.

2. Description of the Prior Art

Conventional rail car braking systems often apply excessive braking force to empty rail cars, causing the wheels to slide on the rails. If the rail car brake system is designed to stop the rail car when it is loaded, it applies too much braking force to the rail car wheels when the rail car is empty. Conversely, if the rail car brake system is designed to stop the rail car when it is empty, it will not provide sufficient braking force to stop the rail car when the rail car is fully loaded.

One prior art solution to these problems is to use "loaded/empty" sensors to monitor the distance between the car body and the unsprung portion of the rail car suspension to determine the load in the rail car. Unfortunately, prior art loaded/empty sensors merely sense whether the car is completely loaded or completely empty, but do not sense intermediate ranges such as when the rail car is partially loaded. Thus, these prior art loaded/empty sensors cannot optimally control the rail car in accordance with the exact weight or load in the rail car.

Another problem with prior art loaded/empty sensors is that they cannot be easily adjusted to compensate for changing brake system conditions such as system air pressure and temperature. Additionally, since prior art loaded/empty sensors utilize mechanical levers and switches, they are subject to wear, freezing, and contact failure.

Accordingly, there is a need for an improved rail car brake system. More particularly, there is a need for an improved rail car load sensor that optimally stops or brakes a rail car in the least amount of distance while eliminating wheel sliding. There is also a need for such a load sensor that more accurately measures the amount of weight or load in the rail car and that does not include mechanical levers and switches that are subject to wear and failure.

SUMMARY OF THE INVENTION

The rail car load sensor of the present invention solves the prior art problems discussed above and provides a distinct advance in the state of rail car brake systems. More particularly, the rail car load sensor provides for the optimal amount of braking force for stopping or braking a rail car in the least amount of distance while eliminating wheel sliding, without the use of mechanical levers and switches.

The rail car load sensor of the present invention is configured for use with a rail car brake controller that is operable for controlling the brakes of a rail car. The rail car brake controller broadly includes a pneumatic valve for directing air to the rail car brake cylinders and a controller for controlling the position of the valve for controlling the amount of air delivered to the brake cylinders.

The rail car load sensor of the present invention monitors or measures the amount of load or weight in the rail car and adjusts the braking action of the rail car brake controller in accordance with this measured load or weight. The preferred rail car load sensor broadly includes a distance sensor and a controller.

The distance sensor senses the distance between two components on or attached to the rail car that move toward or away from one another when the amount of weight or load in the rail car changes. Specifically, the distance sensor senses the distance between a first component on or attached to the rail car that moves relative to the rail in accordance with the weight or load in the rail car and a second component that remains in a relatively fixed position relative to the rail regardless of the weight or load in the rail car. In preferred forms, the first component is the underside of the rail car or a mounting bracket supported thereto. The second component may be the axle, bolster or bearings of the rail car, the rail itself, or any other component of the rail car that remains in a fixed position relative to the rail regardless of the load in the rail car.

The controller is responsive to the distance sensor for generating distance signals representative of the distance between the first and second components and transmitting the signals to the rail car brake controller. These distance signals are representative of the amount of load in the rail car. The rail car brake controller analyzes the distance signals and adjusts the braking force exerted by the brake system in accordance with the amount of weight or load in the rail car.

By constructing a rail car load sensor as described above, numerous advantages are realized. For example, the rail car load sensor of the present invention is operable for sensing any distance between the rail car and the rail. Thus, the rail car load sensor can adjust the braking force of the rail car brake system in response to small changes in the loading of the rail car. This allows the rail car brake controller to provide the optimal braking force to the brake cylinders for stopping or braking the rail car in the least amount of distance while eliminating wheel sliding.

Additionally, the rail car load sensor of the present invention can also detect train derailments. If the distance sensor senses that the distance between the underside of the rail car and the rail changes rapidly or goes outside of an acceptable range (e.g., it drops below a certain distance), the controller can generate an alarm signal for indicating a probable derailment.

Another advantage of the present invention is that each load sensor controller can be programmed to maintain a history of the loaded and empty cycles and the normal loaded and empty limits for its respective rail car. This information can then be used to adjust the braking force of the rail car as the rail car suspension springs' compressive strength changes due to age. Additionally, since the rail car load sensor is electronic, the braking force exerted by the rail car brake system controller can be easily modified without mechanical readjustments.

BRIEF DESCRIPTION OF THE DRAWING FIGURES

A preferred embodiment of the present invention is described in detail below with reference to the attached drawing figures, wherein:

FIG. 1 is a schematic side view of a railroad car showing the load sensor of the present invention coupled with a rail car brake controller;

FIG. 2 is a block diagram of the load sensor and rail car brake controller of the present invention; and FIG. 3 is an exploded schematic side view of the rear wheels of a railroad car showing the load sensor mounted in a second location.

DETAILED DESCRIPTION OF THE PREFERRED EMBODIMENTS

FIG. 1 illustrates preferred rail car load sensor 10 shown coupled with rail car brake controller 12 on rail car 14 riding on rail 15. Rail car load sensor 10 monitors or measures the amount of load or weight in rail car 14 and sends a signal to rail car brake controller 12 for adjusting the operation of the brake system of the rail car in accordance with this measured load or weight.

In more detail, rail car brake controller 12 is preferably an electronic brake system controller such as a Model No. P.N. 081-50101 controller manufactured by Technical Service and Marketing, Inc. of Kansas City, Mo. This type of controller is described in detail in U.S. Pat. No. 5,335,974 (the U.S. Pat. No. '974), hereby incorporated by reference.

Referring to FIG. 2, rail car brake controller 12 controls the brakes of rail car 14 by controlling the amount of air delivered to the rail cat's pneumatically operated brake cylinders 16. Rail car brake controller 12 generally includes a head end unit (not shown) and at least one car control unit 20.

The head end unit is typically positioned in the locomotive of the train and is provided for initiating braking action of the train's rail cars 14. The head end unit includes entry buttons or keys and associated control circuitry for receiving braking commands from an engineer and for transmitting brake signal to car control units 20 via conventional electrical control cabling.

Car control unit 20 receives the brakes signals from the head end unit and controls or activates the brake cylinders 16 of the rail car 14 in response to these brake signals. A separate car control unit 20 is preferably mounted in each rail car 14 of the train.

Each car control unit 20 broadly includes at least one pneumatic valve 22 and controller 24. Valve 22 is coupled with a source of pressurized air and air reservoir tank 23. Valve 22 and its corresponding pneumatic supply are provided for directing air to rail car's 14 brake cylinders 16.

Controller 24 controls the position of valve 22 for controlling the amount of air delivered to brake cylinders 16 in response to the brake signals transmitted from the head end unit. Each car control unit 20 also includes other control electronics, pneumatic valves and air pressure sensors described in detail in the U.S. Pat. No. '974 referenced above.

An engineer initiates rail car braking by activating the appropriate control on the head end unit of rail car brake controller 12. The head end unit translates the engineer's request for a brake application into a target brake cylinder pressure and transmits this target brake cylinder pressure to each car control unit 20 in the train. Each car control unit 20 receives the target brake control pressure and applies the appropriate amount of pressure to its respective brake cylinders 16.

In accordance with the present invention, rail car load sensor 10 monitors or measures the amount of load or weight in rail car 14 and sends a signal to rail car brake controller 12 to adjust the operation of the brake system in accordance with this measured load or weight. The preferred rail car load sensor broadly includes height or distance sensor 26 and controller 28.

Distance sensor 26 senses the distance between two components on or attached to the rail car that move toward or away from one another when the amount of weight or load in the rail car changes. Specifically, the distance sensor senses the distance between a first component on or attached to the rail car that moves relative to the rail when the weight or load in the rail car changes and a second component that remains in a relatively fixed position relative to the rail regardless of the weight or load in the rail car.

As illustrated in FIGS. 1 and 2, the distance sensor 26 is preferably mounted underneath rail car 14 so that the first component is the underside of the rail car or a mounting bracket supported thereto. As illustrated in FIG. 3, the second component may be the axle 30, bolster 32 or wheel bearings of the rail car. As illustrated in FIG. 1, the second component may also be the rail 15 itself or any other component of the rail car that remains in a fixed position relative to the rail when the weight or load in the rail car changes.

Distance sensor 26 includes a signal generator for generating and directing a pulse or signal towards the rail and a receiver for receiving a reflected signal as it is reflected from rail 15. Distance sensor 26 is preferably an ultrasonic type device but may also include other types of position or distance sensors including optical sensors, acoustic sensors, or radar sensors.

Controller 28 is coupled with controller 24 and responsive to distance sensor 26 for generating and transmitting distance signals to controller 24. Controller 28 monitors distance sensor 26 and measures the time interval between the generation of the sensor signals and the receipt of the reflected signals from the rail. Controller 28 converts the measured time interval to a distance signal representative of the distance between rail car 14 and the rail. Controller 28 then transmits these distance signals to car control unit controller 24.

Controller 28 is preferably a programmable microprocessor but may also include other conventional electronic control devices operable for monitoring distance sensor 26 and transmitting distance signals to car control unit 20. In preferred forms, controller 28 may be programmed to maintain a history of the loaded and empty cycles and the normal loaded and empty limits for its respective rail car 14. This information can then be used to adjust the braking force applied by car control unit 20 as the rail car suspension springs' compressive strength changes due to age. Additionally, the braking force exerted by the rail car brake system controller 12 can also be easily modified without requiring mechanical readjustments.

Controller 28 may also be programmed to detect train derailments. For example, controller 28 may be programmed so that when distance sensor 26 senses that the distance between rail car 14 and the rail 15 changes rapidly or goes outside of an acceptable range (e.g., it drops below a certain distance), controller 28 generates an alarm signal for indicating a probable derailment. This alarm signal may be sent to head end unit 18 or may be transmitted to conventional alarm lights and/or horns.

In operation, each rail car load sensor 10 continually monitors or measures the amount of load or weight in its rail car 14 and provides an input signal to car control unit controller 24 for adjusting the braking action of the rail car brake cylinders 16 in accordance with this measured load or weight. Car control unit 20 receives the distance signals, which are representative of or proportional to the amount of load or weight in rail car 14, and adjusts the braking force by adjusting the amount of air delivered to the rail car's brake cylinders 16 in accordance with the amount of weight in rail car 14.

For example, if load sensor 10 determines or measures that rail car 14 is empty, it transmits a distance signal to car control unit 20 that lessens or reduces the braking force called for by controller 24. Conversely, if load sensor 10 determines or measures that rail car 14 is full, it transmits a distance signal to car control unit 20 that increases the braking force called for by controller 24. This allows car control unit 20 to optimally stop or brake rail car 14 in the least amount of distance while eliminating wheel sliding. Additionally, since load sensor 10 can measure any distance between rail car 14 and rail 15, the braking force can be adjusted over an infinite range for optimally braking rail car 14 while eliminating wheel sliding.

Although the invention has been described with reference to the preferred embodiment illustrated in the attached drawing figures, it is noted that equivalents may be employed and substitutions made herein without departing from the scope of the invention as recited in the claims. For example, although rail car load sensor 10 preferably measures the distance between rail car 14 and rail 15, it may also measure other distances representative of the weight or load in rail car 14 such as the distance between rail car 14 and the ground or the distance between rail car 14 and a position on the rail car's suspension system.

Having thus described the preferred embodiment of the invention, what is claimed as new and desired to be protected by Letters Patent includes the following:

1. A rail car load sensor for adjusting the operation of a brake system of a rail car traveling on a rail in accordance with the amount of load in the rail car, the rail car including a first component that moves relative to the rail in accordance with the load in the rail car and a second component that remains in a relatively fixed position relative to the rail regardless of the load in the rail car, said rail car load sensor comprising:

sensor means for sensing the distance between said first component and said second component of said rail car, said sensor means including generating means for generating and directing a transmitted signal towards said second component and receiving means for receiving a reflected signal from said second component; and control means responsive to said sensor means for generating distance signals representative of the distance between said first component and said second component for use in adjusting the braking force of the rail car brake system in accordance with the amount of load in said rail car.

2. The rail car load sensor as set forth in claim 1, said first component being selected from the group consisting of a bottom portion of said rail car and a mounting member attached to said rail car.

3. The rail car load sensor as set forth in claim 1, said second component being selected from the group consisting of an axle of said rail car, a bolster of said rail car, a bearing connected to said axle, and a mounting member attached to one of said axle, bolster, and bearing.

4. The rail car load sensor as set forth in claim 1, said rail car brake system including a brake controller operable for controlling the activation of said brake system, said control means including delivering means for delivering said distance signals to said brake controller.

5. The rail car load sensor as set forth in claim 1, said control means including measuring means for measuring a time interval between the directing of said transmitted signal towards said second component and the receipt of said reflected signal from said second component and converting means for converting said measured time interval to said distance signals.

6. The rail car load sensor as set forth in claim 1, said sensor means including an ultrasonic distance sensor operable for generating and receiving ultrasonic energy.

7. The rail car load sensor as set forth in claim 1, said sensor means including an optical distance sensor operable for generating and receiving optical signals.

8. The rail car load sensor as set forth in claim 1, said sensor means including an acoustic distance sensor operable for generating and receiving acoustic signals.

9. The rail car load sensor as set forth in claim 1, said sensor means including a radar distance sensor operable for generating and receiving radar signals.

10. The rail car load sensor as set forth in claim 5, said control means including a microprocessor.

11. In a rail car brake controller operable for controlling the brakes of a rail car traveling on a rail, the rail car including a first component that moves relative to the rail in accordance with the load in the rail car and a second component tht remains in a relatively fixed position relative to the rail regardless of the load in the rail car, said rail car load sensor comprising:

a distance sensor for sensing the distance between said first and second components, the distance being representative of the amount of load in the rail car, said distance sensor including
    generating means for generating and directing a transmitted signal towards said second component, and
    receiving means for receiving a reflected signal from said second component; and control means coupled with said distance sensor and said rail car brake controller, said control means including
    measuring means for measuring the time interval between the generation of said transmitted signal and the receipt of said reflected signal,
    converting means for converting said measured time interval to a distance signal representative of the distance between said first and second components, said distance signal being representative of the amount of load in the rail car, and
    transmitting means for transmitting said distance signal to said rail car brake controller for adjusting the operation of said rail car brake controller in accordance with said distance signal.

12. The rail car load sensor as set forth in claim 11, said first component being selected from the group consisting of a bottom portion of said rail car and a mounting member attached to said rail car.

13. The rail car load sensor as set forth in claim 11, said second component being selected from the group consisting of an axle of said rail car, a bolster of said rail car, a bearing connected to said axle, and a mounting member attached to one of said axle, bolster, and bearing.

14. The rail car load sensor as set forth in claim 11, said sensor means including an ultrasonic distance sensor operable for generating and receiving ultrasonic energy.

15. The rail car load sensor as set forth in claim 11, said sensor means including an optical distance sensor operable for generating and receiving optical signals.

16. The rail car load sensor as set forth in claim 11, said sensor means including an acoustic distance sensor operable for generating and receiving acoustic signals.

17. The rail car load sensor as set forth in claim 11, said sensor means including a radar distance sdensor operable for generating and receiving radar signals.

18. The rail car load sensor as set forth in claim 11, said control means including a microprocessor.

* * * * *